(12) United States Patent
Bryan (10) Patent No.: US 7,566,076 B2
(45) Date of Patent: Jul. 28, 2009

(54) CONDUIT FITTING FOR CONDUITS

(76) Inventor: Hughes Lane Bryan, 2699 CR 2296, Quinlan, TX (US) 75474

( * ) Notice: Subject to any disclaimer, the term of this patent is extended or adjusted under 35 U.S.C. 154(b) by 150 days.

(21) Appl. No.: 11/309,893

(22) Filed: Oct. 18, 2006

(65) Prior Publication Data

US 2007/0176411 A1 Aug. 2, 2007

Related U.S. Application Data

(60) Division of application No. 10/985,370, filed on Nov. 10, 2004, now abandoned, which is a continuation-in-part of application No. 10/074,924, filed on Feb. 14, 2002, now abandoned.

(51) Int. Cl.
*F16L 55/00* (2006.01)
(52) U.S. Cl. .......................... 285/15; 285/31
(58) Field of Classification Search ............ 285/148.18, 285/31, 148.23, 417
See application file for complete search history.

(56) References Cited

U.S. PATENT DOCUMENTS

| 2,449,265 | A | * | 9/1948 | Williams | 138/118 |
|---|---|---|---|---|---|
| 3,826,521 | A | | 7/1974 | Wilhelmsen | |
| 3,971,574 | A | | 7/1976 | Curtin | |
| 4,035,002 | A | | 7/1977 | Curtin | |
| 4,386,796 | A | * | 6/1983 | Lyall et al. | 282/31 |
| 4,521,037 | A | | 6/1985 | Knox | |
| 4,687,232 | A | | 8/1987 | Zimmerman | |
| 4,690,434 | A | | 9/1987 | Schmidt | |
| 4,858,958 | A | | 8/1989 | Harbeke | |
| 5,033,512 | A | | 7/1991 | Abbema | |
| 5,098,134 | A | | 3/1992 | Monckton | |
| 5,393,103 | A | | 2/1995 | Cretzler | |
| 5,624,139 | A | | 4/1997 | Van Kooten | |

* cited by examiner

*Primary Examiner*—Aaron M Dunwoody
(74) *Attorney, Agent, or Firm*—Daniel V. Thompson (57) ABSTRACT

A unitary conduit repair joins first and second conduits each having open ends spaced from one another a predetermined distance, wherein the repair includes a unitary tubular body having a first end portion with an elongated female portion and an opposite second end portion with a male portion, and the unitary body has a total length greater than the predetermined distance between the ends of the first and second conduits.

2 Claims, 4 Drawing Sheets

CONDUIT FITTING FOR CONDUITS

This patent application is related to application Ser. No. 10/985,370, filed Nov. 10, 2004, now abandoned, and application Ser. No. 10/074,924, filed Feb. 14, 2003, now abandoned, and Disclosure Document 471014 deposited on Mar. 17, 2000.

TECHNICAL FIELD

This invention relates to a simple unitary, conduit repair fitting, for repair of a damaged conduit and its associated connection to a valve or the like wherein a small section of the conduit is removed and an elongated female portion of the conduit repair fitting is slid over a first open end of the damaged conduit and subsequently extended into a female portion located at the end of the second conduit open end to complete the connection. An adhesive is used to secure the conduit repair fitting to the damaged first conduit to the end the second conduit. The invention also relates to a method of repairing damaged conduits wherein a unitary conduit repair fitting with a pre-glued interior elongated female portion and pre-glued exterior male portion are connected to and secured with a damaged first and second conduits. The unitary conduit repair fitting is easily installed by a simple push-pull action to connect the ends of two conduits for the repair or installation of conduits or pipes.

BACKGROUND OF THE INVENTION

Plastic pipes are almost exclusively used in lawn and landscape irrigation and sprinkler systems because of ease of installation, low price and repair. Such pipes are commonly referred to as PVC pipes because of their plastic chemical composition being of polyvinyl chloride composition material. These pipes are almost always joined by the application of an adhesive such as a solvent or cement, that is applied to the ends of the pipes and associated fittings, valves etc. then the mating pieces are pushed together to complete the connection joint between mating components of an irrigation system. Repairs of an irrigation system are usually needed to the segment of a pipe adjacent to a flow control valve or a sprinkler head because these components of an irrigation system are near or at the surface of the earth and they are damaged by vehicles driving over them, lawn mowers cutting them or other traffic that bends and or breaks them. In the case of underground mounted valves they may simply break or wear out and need replacement. In any case the most typical location for an irrigation system to be damaged is in the segment of the pipe near a valve or sprinkler head wherein the pipe is broken thus permitting an unintended flow of water from the pipe. Examination of such damage to irrigation systems has shown that the pipe is most often broken within either adjacent to a valve or sprinkler head or within a few inches thereof.

When the pipes of an irrigation system are broken the repairman is faced with two basic options either, (1), a reconstruction by removing the entire broken pipe and valve or sprinkler head and associated fitting and replacing both or, (2), by a repair by replacing the damaged end portion of the pipe along with the valve or fitting associated with the sprinkler head. Below is described the prior art reconstruction methods including the several prior art repair methods and related hardware.

In the past reconstruction of damaged irrigation systems involved removing the dirt around long sections of damaged pipe (at least 3 feet (approximately 1 meter) or more) is removed from the ground so that a new segment of pipe could be installed. In this repair process the pipe would have to be free of ground contact to permit sufficient bending of the replacement section of pipe to permit its being joined to the remaining pipe by a collar or the like and also to the replaced valve or sprinkler head and its associated fitting. This reconstruction process can involve considerable labor to dig the pipe free for an extended distance. Then when the reconstruction is completed the pipe must be buried again and the turf and or plants that were disturbed must be carefully replaced to preserve the aesthetic appearance of the location. Also, due to physical limitations of some irrigation systems involving multiple pipes or other earthen obstacles such as concrete barriers driveways barriers, driveways, walkways or foundations the described manner of repair may be very difficult if not impossible.

Additionally, in the prior reconstruction of irrigation systems the replacement of pipe sections by replacement of elongated pipe sections required extensive evacuation of water from the defective pipe section as well as its excavation from the ground allowing space for installation by bending the pipe to permit connecting by couplings and the like. Both the evacuation of water and the excavation of earth are time consuming as well as messy depending upon the local conditions. These prior art replacement pipe sections also required that the length of pipe be inserted into place be measured to an exact length so the pipe will be properly joined on both ends to the accompanying segments or fixtures of the irrigation system. This exact measurement can be time consuming and result in wasted material and time if not done with care and precision.

The prior art repair method for irrigation systems involves using a repair coupling on a small segment of the pipe adjoining the valve or sprinkler head. In this area of the prior art a small section of pipe containing the break is dug our out and a repair of coupling device is used to span the broken section of pipe. However, in practice, it has been observed that great difficulty is encountered in installing these repair coupling devices.

The available prior art patch repair devices include either external bolt on patches that can be used to temporarily repair a defective pipe system or other devices with complex multi-piece units with telescoping members. Both of these general types of repair devices have shortcomings in their installation and operation that may cause the repair to fail in time.

The external bolts on devices merely attach to the exterior of a pipe or valve or the like and clamp a seal element and a supporting structure on the exterior of the damaged portion. These external patch repair devices suffer from a distinct disadvantage because the damaged section is not removed and replaced therefore the irrigation pipe, valve, sprinkler head, or fitting may continue to erode under the seal of the patch. Because of continued eroding the repair is only temporary and a permanent patch will eventually need to be installed in the irrigation system.

The prior art of irrigation pipe repair devices in its basic form includes the simplest use of common couplings and a segment of pipe for joining the open ends of unthreaded pipe sections. A first coupling member adapted to be fitted over and adhered to an open end of one pipe section with the pipes opposite end portion extending over and beyond the end of the attached pipe. A second coupling member having a female portion at each end portion thereof is fitted over and adhered to the open end of the other pipe section with one of the female end portions extending therefrom and exposed. The free pipe end and the second coupling are simply joined together and secured by adhesive to complete repairing connection of the pipes. This irrigation pipe repair technique requires that the pipes be precisely measured and one of them be bent in such a way as to allow the couplings to be joined and moved into their final joined resting position.

The prior art also includes several pipe repair coupling devices using a hollow telescopically extendable member mounted inside a cylindrical housing. In this arrangement the cylindrical housing is connected and secured to an end of a pipe and the hollow telescopically extendable member is extended to connect with and secured by adhesive to the end of another pipe. Several variations of this general mechanical arrangement are known in the prior art with variances in construction of the connecting ends of the device and the slip joint construction of the telescopic member. In some constructions the cylindrical housing may have a protective outer sleeve for protection of the inner workings of the device and to serve as a handgrip for installation.

Considering the complexity of some of these devices they can be costly to produce and assemble as well as being subject to damage if not kept extremely clean prior to installation. In every instance these constructions include an elongated hollow cylindrical chamber that is common with the fluid carrying opening of the pipe and a piston portion of the telescopically extendable member. Seals such as o-rings are provided around the piston portion of the telescopically extendable member to seal with the interior of the elongated hollow cylindrical chamber forming a dynamic seal. When the device is installed and fluid under pressure is passed through the pipe there is a differential pressure exerted on the piston portion with the result of forcing the telescopically extendable member that forces it to be extended. When fluid pressure is no longer on the pipe there is no pressure on the piston portion of the telescopically extendable member, thus it is not forced to an extended position. Because of the pressure on and pressure off operating conditions of irrigation systems the pipes connected with this character of device will be continually stressed by the changing forces on them. As a result it has been noted that where such pipe repair devices are used the adjacent pipe sections, and connected Tee-joints, connection collars, valves and sprinkler heads may incur further damage due to the dynamic forcing action inherent with use of this character of repair device.

All of the prior art connectors have shortcomings that render them difficult to use in repairing damaged pipes of an irrigation system where the ends of the damaged pipe are either buried in the ground or otherwise immovable. Some of these devices require extensive excavation to be installed. And, other devices have extendable members that are subject to creating difficult installations or may by their inherent nature cause other problems in an irrigation piping system.

SUMMARY OF THE INVENTION

A unitary pipe repair fixture and a method of application of same for repairing unthreaded pipes with glue is offered as a replacement for small damaged pipe sections, in place, in the ground. The repair fixture is a one piece tubular housing device with an elongated female portion on one end thereof and a shorter male end portion at its opposite end. The elongated female portion is pushed over a first cut pipe end allowing pulling-insertion of the opposite male end portion into a receiver or replacement fixture on a second cut pipe end.

It is an object of this invention to provide a unitary conduit repair fitting and method of installing same to repair a damaged segment of a conduit that has been removed which will overcome deficiencies of the prior art by removing the damaged portion of the pipe then joining the two ends of good pipes and replacing damaged pipe portion with a simple one-piece connection.

It is a major object of the invention to provide a repair method for repairing a damaged underground conduit wherein a minimal amount of excavation is required. To this end a relatively short length of a damaged conduit is cut out and removed, and no substantial bending of the buried conduit is needed to install the unitary conduit repair fixture or coupling and connect and secure it with the conduit to complete the repair.

Also another object of this invention is to obviate the prior need to extensively excavate the damaged conduit and bend or flex the cut pipe upward and downward in order to position the repair device and the conduits into alignment for final connection. Because excavation is minimized it reduces the labor necessary to repair buried conduits such as landscape irrigation systems thus cause minimal damage to tree roots, turf grass, flower beds and landscaping in general.

Another object of this invention is to provide a conduit repair coupling that during installation requires only a slight offsetting of the ends of the pipe being repaired to permit insertion of a first end of the pipe into the elongated female portion of the coupling as well as a sliding or pulling the female portion of the coupling back over the first pipe on which it is placed then repositioning of the conduit pipe to permit positioning of the opposite male end portion of the conduit repair coupling into alignment with a coupler, Tee, or receiver that is installed on the end of the second pipe.

The present invention can be practiced on any irrigation or piping system in which only the damaged portion of the conduits or pipe is accessible. The invention permits a localized conduit repair operation using the unitary conduit repair fixture or coupling thereof as a simple, quick and easily installed device and method of installation.

A still further object of the invention is to provide some simplification to the repair of irrigation pipe systems and the like, making it possible to provide a one-piece conduit repair fitting or coupling adapted for the repair of commonly damaged irrigation pipe. In addition the invention provides a unitary conduit repair coupling for use in plastic pipe repair wherein the adhesive, cement or glue is applied to both the female and male portions of the conduit repair fitting or coupling, to one exposed end portion of one broken/cut pipe, and to a female receptacle such as a Tee, collar or other coupling, valve or the like that has been secured to the opposite end portion of the connecting pipe. The method of using this invention includes applying the adhesive, cement or glue to the conduit repair fitting or coupling then inserting one end of the pipe into the elongated female portion; then sliding or pulling the repair fitting or coupling back in the opposite direction over the pipe to permit alignment of its male portion with a female portion of a coupler or receiver that is installed on the end of the second pipe to complete the repair. The method of this invention is accomplished in a short time span before the adhesive, cement or glue becomes set and rendering the parts sealed and immovable.

In view of problems found in the art, it is a general object of the present invention to provide an easily attachable in-line one-piece male-female conduit repair fitting or coupling for repairing pipe and in particular in pipes used in landscape irrigation pipe systems.

It is another object of the present invention to provide an aligned pipe joint repair device in the form of a one-piece male-female conduit repair fitting or coupling for pipe repairs of reasonable brevity and length which creates little or no added flexural or compressive stress to the existing pipeline or pipe system.

The present invention discloses a one piece conduit repair fitting or coupling and method of using same for the repair of pipe or conduit systems. The conduit repair fitting or coupling of this invention has an elongated female end portion for receiving a first cut end portion of a pipe and a male end portion designed to be displaced into a receiver or a coupler that has been cemented on the end of a second cut pipe to join the first and second cut pipe ends. The method of using the conduit repair fitting or coupling of this invention involves the removal of a segment of the damaged pipe or conduit thus forming first and second ends of the pipe to be reconnected, installing a coupling or receiver such as a Tee, collar, valve or sprinkler head on one end of the pipe; applying adhesive to the interior of the elongated female end portion of the conduit repair fitting or coupling and to the exterior of the male portion thereof; sliding the female portion of the conduit repair fitting or coupling over the first pipe; aligning the male portion of the conduit repair fitting or coupling with the a coupling or receiver that is attached to the second pipe; and then displacing the conduit repair fitting or coupling to insert the male portion thereof into the coupling or receiver that is attached to the second pipe to complete the reformation and fluid tight connection of the damaged pipe or conduit.

Also, the present invention overcomes major short comings of the prior art because it is a unitary structure and has no moving parts such as pistons, telescopic members, O-rings or the like that are subject to failure, incorrect installation or damage as do the prior art devices. Another shortcoming of the prior art that is overcome by this invention is the avoidance of the need to excavate and evacuate long sections of the pipe in order to repair it. Because this invention only repairs the damaged section of the pipe it requires only a minimal excavation of the damaged section and slightly more for maneuvering the invention into place and installation of it. Because excavation is confined to only a relatively small zone the disruption to the landscape is also minimal and easily repaired.

The accompanying drawings, which are incorporated in and constitute a part of this specification, illustrate a preferred embodiment of the invention, and together with the description, serve to explain but not limit the principles of the invention.

DETAILED DESCRIPTION OF THE INVENTION

Figure 1:
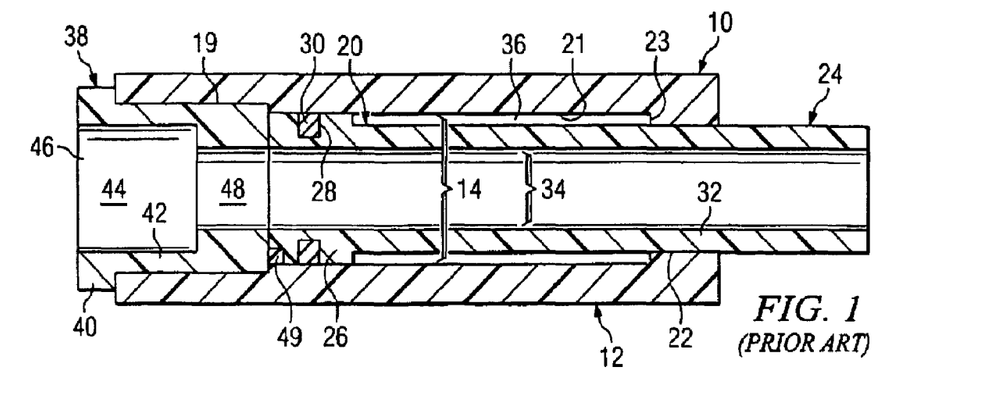
FIG. 1 is a longitudinal sectional view of one prior art pipe repair coupling employing a telescopically extendable connection to facilitate repair according to the prior art.
Figure 2:
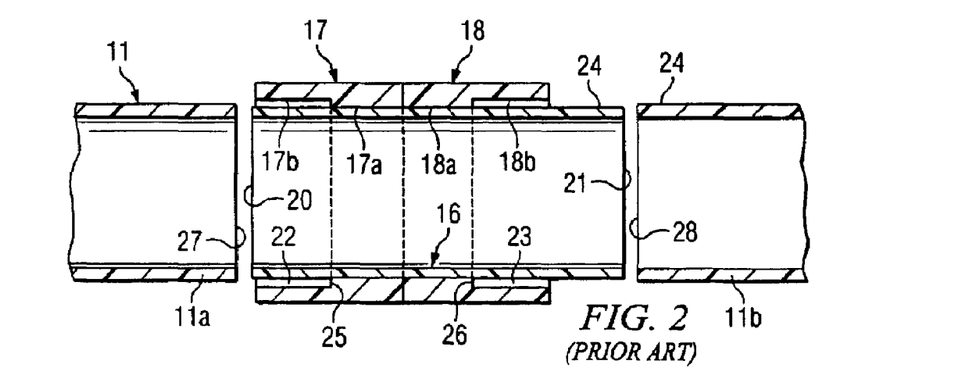
FIG. 2 is a longitudinal sectional view of another prior art pipe repair coupling employing displaceable collars to form a pipe repair coupling.

FIG. 1 and FIG. 2 are prior art devices for repairing damaged pipe sections in irrigation systems and other underground installed pipe systems. FIG. 1 is a cross sectional view of a pipe repair coupling (shown in FIG. 2 thereof) from the patent of Zimmerman U.S. Pat. No. 4,687,232 employing a telescopically extendable connection to facilitate repair.

In FIG. 1 Zimmerman teaches slip joint style pipe repair coupling 10 having a joint housing 12 containing a Piston pipe 24 extendable from one end thereof and a reducer bushing 38 mounted on its opposite end. Joint housing 12 includes an axial bore 14 containing piston pipe 24 so that is may move in a telescopic motion therein. Piston pipe 24 has an enlarged piston section 26 at its innermost end with an o-ring 30 providing sealing contact between piston portion 26 and axial bore 14. Joint housing 12 has a bushing socket 19 at one end to contain reducer bushing 38. Reducer bushing 38 has a two stage axial bore 44 to afford the passage of fluid from that end of the device into piston pipe 24. When installed in a pipe system and connecting two segments of previously damaged pipe reducer bushing 38 is connected to one pipe segment and piston pipe 24 is connected to the other pipe segment. In this installation piston pipe 24 is displaced from the position shown to an extended position further to the right from the position shown in FIG. 1. When piston section 26 is displaced to the right and fluid is passed through this device under pressure a differential pressure is created because of the end surface of piston section 26 that faces reducer bushing 38 forms a pressured surface being larger in diameter, thus larger in area, than the diameter of inner bore 34 inside piston pipe 24. Because of this differential pressure piston pipe 24 will be exerting a longitudinal force on the attached pipe when the fluid therein is under pressure and not exerting such pressure when the fluid in the pipe system in not under pressure. In a landscape irrigation system water flowing in the pipe system is under pressure when it is in operation and not under pressure when it is not operating. In practice the operating cycle may be as much as several times per day or as little as once each week, depending upon the local climate conditions and what specific vegetation is being irrigated. Over a period of time the constant changing of longitudinal pressure forces on the piping system will cause it to move and eventually damage other parts of the piping system.

Figure 3:
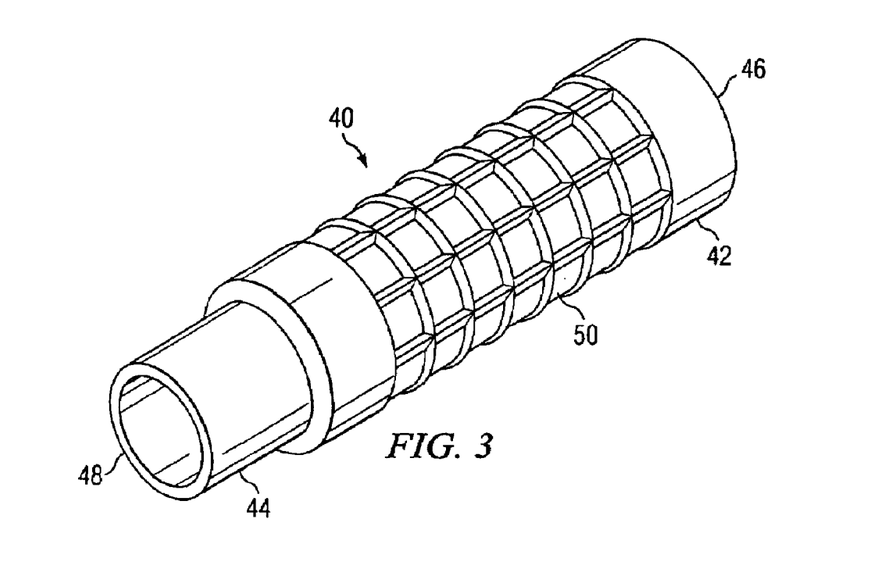
FIG. 3 is a perspective view of the exterior of present invention showing the elongated female portion with a handgrip exterior and the molded one-piece a shorter male portion.

FIG. 2 Knox, U.S. Pat. No. 4,521,037, it teaches a coupling for joining two pipe sections by using two telescopically movable collars positioned over opposing end portions of pipes to be connected that are extendable over a connecting pipe extension section. In FIG. 2 the plastic pipe 11 to be repaired is illustrated with the opposite ends thereof 27 and 28 spaced apart and a tubular member positioned there between. A pair of collars 17 and 18 are positioned on tubular extension 16. Each collar respectively includes an inner bore 17a and 18a and a larger outer bore 17b and 18b. The inner bores 17a and 18a are sized slightly larger than the exterior of tubular extension 16 and the larger outer bores 17b and 18b are sized to be slightly larger than the exterior of pipe end portions 11a and 11b. Tubular member is accurately and precisely cut to be slightly shorter than the distance between the opposing ends of pipe 11. In the process of installation tubular extension 16 is located between the ends of pipe 11 and collars 17 and 18 are positioned on tubular extension 16 as shown in FIG. 2 with the larger diameter bores 17b and 18b facing in opposite directions. An adhesive or glue is applied to the exterior of the facing end portions of pipe 11 and tubular extension 16. To complete the installation collars 17 and 18 are displaced in opposite directions to a resting position overlapping pipe end portions 11a and 11b to seal the fluid connection of the pipe. This construction has the disadvantage of requiring tubular member to accurately measured to fit between the ends of pipe 11 so that when collars 17 and 18 are moved to their final resting position the fluid seal will be properly placed an adequately sealed when fluid pressure is applied to the pipe system again. In the event that tubular extension 16 is not accurately measured and cut to fit between the ends of pipe 11 it will cause collars to be incorrectly placed with respect to ends of the pipe and may degrade the sealing capability of this coupling device. Collars 17 and 18 as shown in this prior art patent are relatively narrow in longitudinal length therefore any incorrect measuring or cutting of tubular member may cause one or both of them to only be in contact with tubular extension in a small area thereby creating a weak joint. Also in the event that the adhesive is not spread completely over the pipe end portions 11a and 11b and over tubular extension 16 it will cause an insecure joint that has a likelihood of leaking FIG. 3 is a perspective view of an embodiment of the present invention. The pipe repair fixture 40 comprises a one piece tubular molded housing with an elongated female portion 42 at one end thereof and a shorter male portion 44 at the opposite end thereof. The elongated female portion 42 comprises the majority of the length of the device and is intended to be placed over one end of a pipe to be repaired. Female end portion 42 has an outer end 46 at the exposed end thereof. Male portion 44 is elongated to a lesser extent than female portion 42 and is intended to be connected into a receiver such as a pipe coupling, Tee, valve, sprinkler head assembly or the like. Male end portion 44 has an outer end 48 at the exposed end thereof. The exterior of female portion 42 has a handgrip surface 50 to facilitate ease of installation in wet environments and reduce slippage. Handgrip surface 50 is shown as a windowpane style surface however this surface may be formed in other surfaces such as a plurality of bumps or a crosshatch design to provide a textured hand engageable slip resistant surface to assist in installation in the presence of moisture and mud. The interior of female portion 42 and the outside diameter male of portion 44 are dimensionally consistent with standard pipe sizes.

Figure 4:
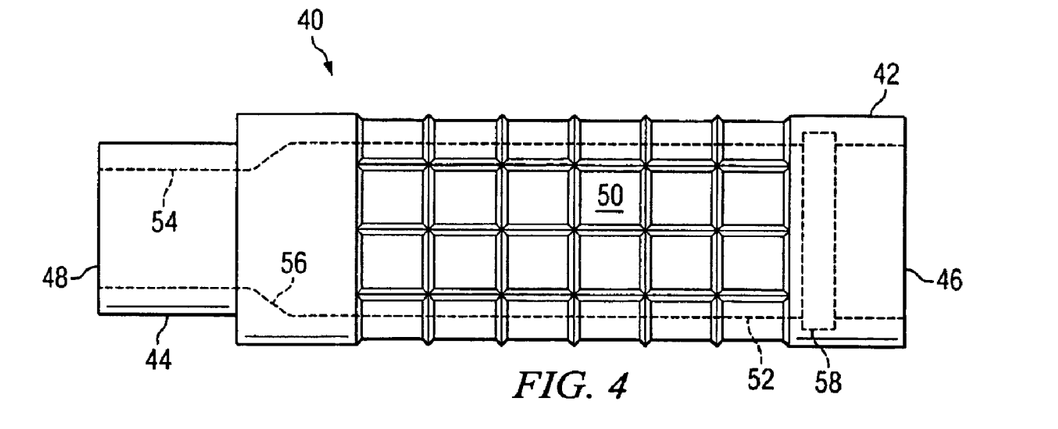
FIG. 4 is a longitudinal side view of the conduit repair fitting or coupling of this invention with the interior thereof shown in dashed lines.

The present invention is also shown in a longitudinal side view in FIG. 4 with the interior thereof shown in dashed lines. The interior of pipe repair fixture 40 has an internal fluid passageway connecting its opposite ends. Elongated female portion 42 has a cylindrically shaped internal surface 52 with a uniform internal diameter. Male end portion 44 has a cylindrically shaped internal surface 54 of a uniform internal diameter that connects to outer end 48 via a transition segment 56. Female end portion 42 has an internal groove 58 spaced a distance from outer end 46 thereof. Groove 58 is of a larger diameter than internal cylindrical surface 52 and is provided to function as a reservoir for glue or other adhesive used to join this repair fixture with the connection pipe. Groove 58 is shown as being rectangular in cross section and oriented perpendicular to the longitudinal axis of pipe repair fixture 40, however it is understood that it may have other shapes and/or multiple grooves and perform the same function.

Figure 5:
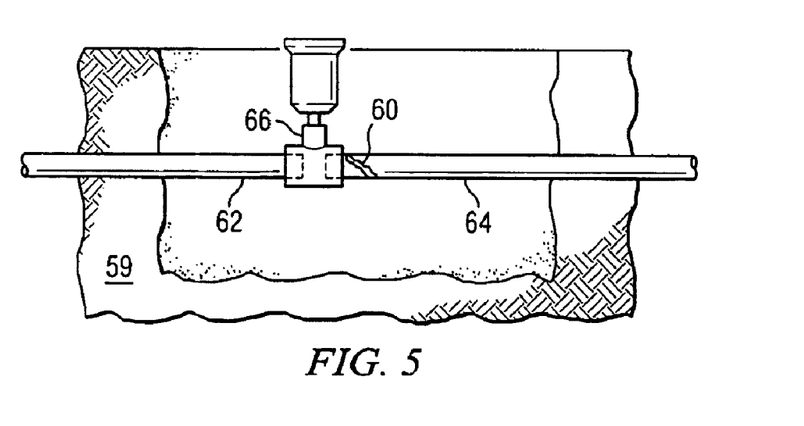
FIG. 5 is a cross-sectional schematic view of a broken pipe in the earth with the dirt removed in a small space exposing the break and showing a Tee and sprinkler head.

FIG. 5 illustrates in schematic a cross-sectional view of a typical broken pipe of buried landscape irrigation system in the ground. Such irrigation systems are commonly made using plastic pipes and components made from a poly vinyl chloride material commonly called PVC. Because this material is easily connected and bonded together by using first a cleaner solution to clean and chemically prepare the material for bonding and an adhesive or glue to secure two segments of this material.

The first step in repairing a buried pipe is to dig out some earth 59 around the damaged pipe segment forming a cavity around the damaged section so the damaged parts can be removed and the repair can be made. The break 60 in this pipe separates it into two segments 62 and 64 on either side thereof. FIG. 5. Shows a typical broken pipe in a landscape irrigation system where break 60 occurs adjacent to a fixture 66 such as a remotely controlled valve, sprinkler head support fixture connecting Tee or Elbow, or junction to another pipe. It is obvious to one skilled in the art that fixture 66 can be any number of different irrigation devices connected in the pipeline. Regardless of the specific type of fixture 66 it will have a female receptacle on at least one side thereof that is joined to the irrigation pipe. In the practice of repairing landscape irrigation systems it has been noted that most breaks in the pipe occur adjacent to such fixtures because they extend above or in close proximity to the surface of the ground and are susceptible to damage. Common causes for damaging such fixtures are; being hit with operating lawnmowers, cars driving over them, and pedestrian traffic. When beginning a repair of such a broken pipe one of the first steps is to excavate the earth 59 forming an open cavity around break 60 to expose it and end portions 62 and 64 of the broken pipe as shown in FIG. 5.

Figure 6:
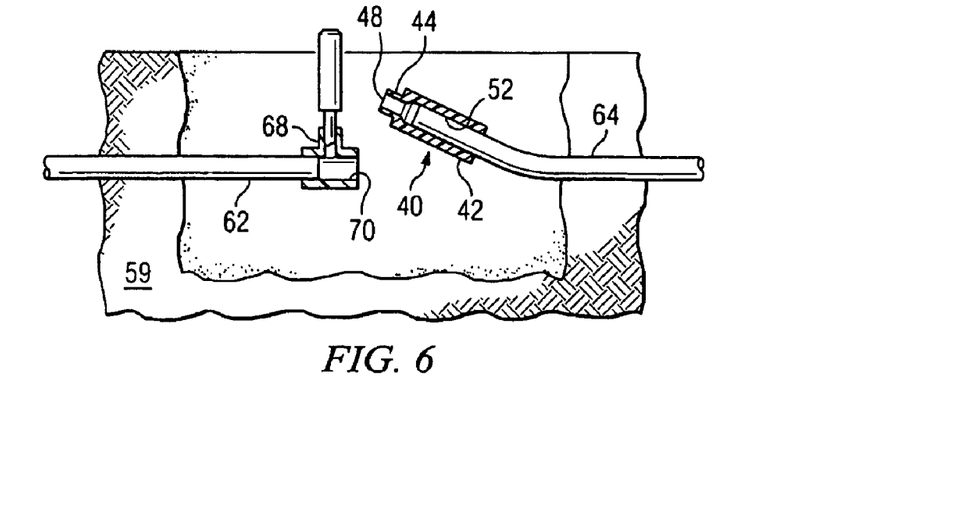
FIG. 6 is a cross sectional schematic view a broken pipe being repaired in the earth with the dirt removed and having one pipe displaced upward sufficiently for the conduit repair fitting or coupling of this invention to have the female portion thereof positioned over one pipe and with a Tee and sprinkler head attached in position on the opposite pipe end.

FIG. 6 shows the present invention in the process of being installed. The next step in the repair is to remove the damaged pipe segment and other parts that must be replaced. As shown in FIG. 6 the ends of pipe end portions 62 and 64 are cut to remove break 60 and fixture 66. Cutting pipe end portions 62 and 64 is done to provide a predetermined range of spacing between the end of pipe portion 64 and the facing end of replacement fixture 68. This sizing of the length to a predetermined spacing is necessarily less than the length of female end portion 42 internal cylindrical surface 52 for reasons that will become apparent in later steps of the installation.

Because fixture 66 is to be replaced with a new device and irremovably secured to pipe end portion 62 it will be replaced with a new but similar device to function in the in the irrigation system. For simplicity and illustration purposes in FIGS. 6, 7 and 8 the replacement fixture is shown as a slightly differently shaped sprinkler head, riser pipe and Tee, designated 68. Typically installed devices represented by fixture 66 or replacement fixture 68 have a female connector on one or both sides thereof to facilitate attachment with a pipe.

The next step in repairing the damaged pipe is to install replacement fixture 68 by cementing it to pipe end portion 62 by using a cleaner and glue as described above. Within a few minutes of being coated with the glue and being mounted on pipe end portion 62 replacement fixture 68 will be substantially permanently connected as the glue sets.

The next step in repairing the damaged pipe is to clean the surfaces of the several parts of replacement fixture 68 and pipe repair fixture 40 and pipe end portion 64 that will be in contact when the repair is completed. The parts to be coated are specifically the unattached end of pipe end portion 64, the interior cylindrical surface 52 of pipe repair fixture female portion 42, the exterior surface of male end portion 44, and the presently unattached interior surface 70 of replacement fixture 68. A length of pipe end portion 64 is cleaned that is at least as long as the longitudinal length of pipe repair fixture interior cylindrical surface 52 female portion 42. In pipe repair fixture 40 its internal cylindrical surface 52 is cleaned. This is easily done because the applicator commonly used with cleaners and glues for PVC pipe consists of a small somewhat spherical swab element attached to the end of a short length wire with an enlarged container cap at its opposite end. Typically the wire is several inches in length and will provide sufficient reach for the swab to reach the innermost end of internal cylindrical surface. The cylindrical exterior surface of pipe repair fixture male end portion 44 is cleaned over its entire surface. The interior surface 70 of replacement fixture 68 is also cleaned over its entire surface. This must be done with some care if the part to be installed is a valve so the cleaner fluid does not enter and damage the device.

It should be noted that solvent type, liquid cement when applied to the exterior surfaces of PVC pipe, tends to spread or run until only a relatively thin coating adheres to the pipe. As is well known in the practice of assembly of such plastic piping systems the cement will set rather rapidly so the parts must be assembled quickly to the desired final resting position. Applicant's structure is adapted for rapid final positioning of the coated parts as described in the following.

Once the cleaning is completed the next step is to applying the glue or cement to the previously cleaned surfaces. The surfaces coated with the glue in this step are; the exterior end surface of pipe end portion 64, female end portion internal cylindrical surface 52 including glue retaining groove 58, the exterior surface of male end portion 44, and fixture interior surface 70. Once these surfaces are coated then pipe end portion 64 is bent or displaced upward in a curved manner as shown in FIG. 6 so that pipe repair fixture female end portion 42 can be slipped over pipe end portion 64 and then longitudinally displaced there over. FIG. 6 shows the pipe displaced to an exaggerated position for clarity, however it need only be displaced sufficient to allow female end portion 42 to be slipped over pipe end portion 64.

Figure 7:
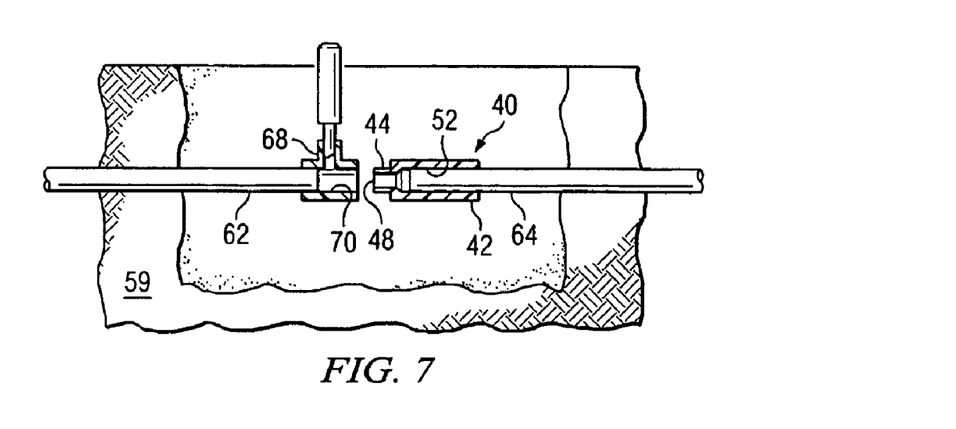
FIG. 7 is a cross-sectional schematic view of a broken pipe being repaired in the earth with the dirt removed showing the conduit repair fitting or coupling of this invention with the female portion thereof positioned over and in a fully retracted position on one pipe and in axial alignment with a Tee and sprinkler head attached to the opposite pipe end.

Female end portion 42 is displaced over pipe end portion 64 a substantial distance so that it can be lowered into longitudinal alignment with replacement fixture 68 and the end 48 of male end portion 44 will pass the exposed end of replacement fixture 68 without contacting same. FIG. 7 shows pipe end portions 62 and 64 in longitudinal axial alignment with each. A position that also brings replacement fixture 68 and pipe repair fixture 40 into this axial alignment.

The distance female end portion 42 can be slipped over pipe end portion 64 will depend upon the open spacing between the end of replacement fixture 68 and pipe repair fixture end 48. If fully retracted the end of pipe end portion 64 will be in contact with transition segment 56 inside female end portion 42.

Figure 8:
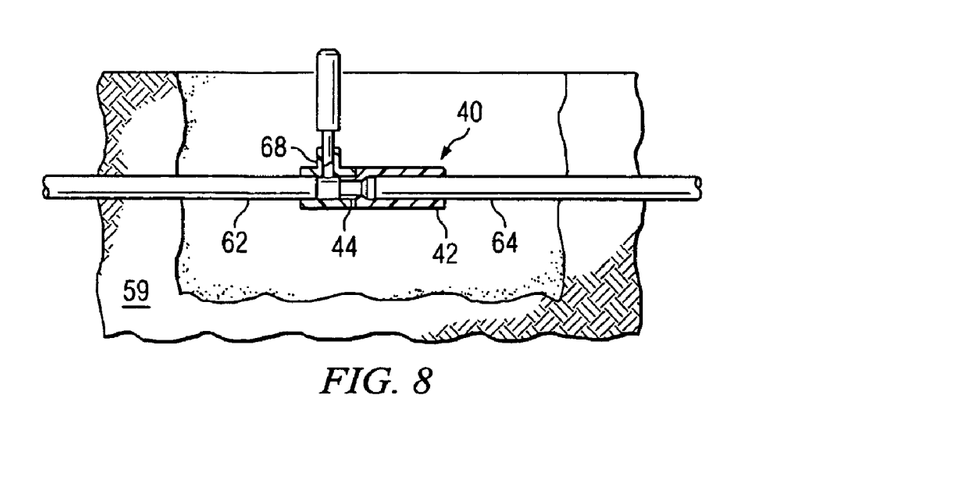
FIG. 8 is a cross-sectional schematic view of a broken pipe being repaired in the earth with the dirt removed showing the conduit repair fitting or coupling of this invention in its installed position with the female portion thereof positioned over an end portion of one pipe and its male portion engaged in a Tee and sprinkler head attached to the opposite pipe end.

Once the alignment as shown in FIG. 7 is achieved then pipe repair fixture 40 is displaced toward replacement fixture 68 to the position shown in FIG. 8. FIG. 8 represents the final resting position of pipe repair fixture 40. As pipe repair fixture 40 is displaced from the position shown FIG. 7 to the position shown in FIG. 8 male end portion 44 in inserted into the opening of replacement fixture 68 as far as it can be in order to insure the joint is completely connected. It should be noted that because of the relatively quick setting glue or cement used to join PVC materials the steps to slide pipe repair fixture 40 over pipe end portion 64 and move its male end portion 44 into replacement fixture 68 must be done quickly to avoid the cement setting and preventing the desired connection.

Also, as pipe repair fixture 40 is moved into contact with replacement fixture it is preferably rotated about the longitudinal axis of the pipes so as to swirl or spread the glue between pipe end portion 64 and female end portion internal cylindrical surface 52 and between male portion surface 44 and its contacting fixture interior surface 70. The amount of rotation does not require several complete rotations but only a sufficient amount to cause a spreading of the glue in the event that any portion of the surfaces are not fully coated. Handgrip 50 on the exterior or pipe repair fixture 40 aids in the hand administered displacement and rotation of this part in the event it has become wet or otherwise slippery to the touch. The motions of installing pipe repair fixture 40 on the pipe end portion 64 and into replacement fixture 68 can be described as a "Push-Pull Motion". Wherein pipe repair fixture 40 has its female end portion 42 "Pushed" over pipe end portion 64 and then "Pulled" into contact with replacement fixture 68 to complete the pipe joint and fluid part of the irrigation system.

When the installation of pipe repair fixture 40 is complete it should be noted that this element is securely attached or bonded to both pipe end segments 62 and 64 so that fluid under pressure can again be transmitted through the repaired segment of pipe along with any other associated fixtures such as valves, water spray heads etc. Because there are no moving or displaceable parts within pipe repair fixture 40 when it is installed its length remains fixed so no longitudinal pressure is exerted on the pipe system as is done with other prior art type of repair fixtures that due to their extendable construction will exert longitudinal forces on the pipe system when fluid pressure is applied to the irrigation system.

The next step in repair of the broken irrigation pipe is to apply water under pressure to the irrigation system to check for any possible leak in the repaired joints.

The final step in the repair of the broken irrigation pipe is to replace the removed earth 59 in the excavated cavity containing the repaired pipe so the irrigation system can be returned to use and have its normal appearance.

Figure 9:
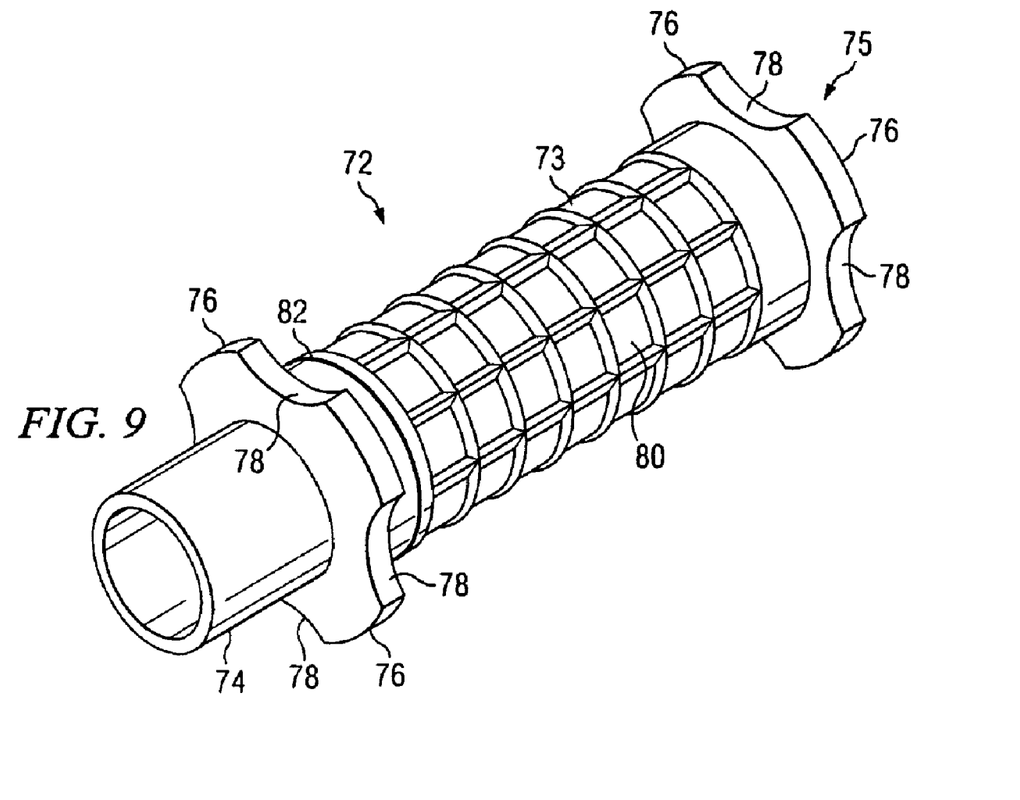
FIG. 9 is a perspective view of the conduit repair fitting or coupling of this invention with the female portion thereof having a textured hand grip and radially enlarged segments or protrusions at the ends of the female portion.
Figure 10:
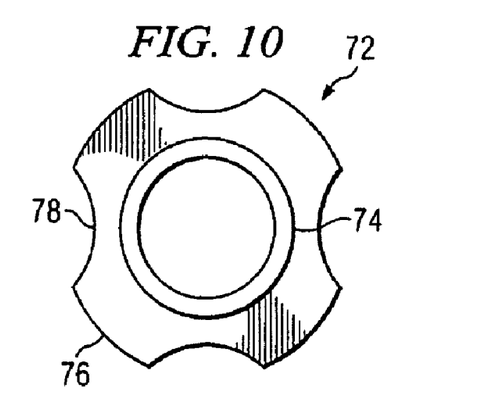
FIG. 10 is an end view of the conduit repair fitting or coupling of this invention taken from the male end portion thereof showing the radially enlarged segments or protrusions and adjacent recesses at the exterior of the female end portion thereof.

An additional embodiment of this invention is designated generally at 72 and shown in FIGS. 9 and 10. This embodiment of the pipe repair fixture has the same basic elements as the embodiment shown and described above with a female end portion 73 on one end thereof and the male end portion 74 on its opposite end. This embodiment of the pipe repair fixture 72 has a plurality of circumferentially enlarged segments or protrusions around the exterior of opposite end portions of female end portion 73. One set of enlarged segments 76 is located at the end portion 75 of female end portion 73. The other set of circumferentially enlarged segments 76 are located at the juncture of female end portion 73 and male end portion 74. Enlarged segments 76 are shown as being protrusions that are circumferentially enlarged from the exterior of handgrip surface 80 with a convex outer surface. It is to be noted that if desired a single protrusion or enlarged segment could be used rather than a plurality of such segments Is with it located only at one end portion of the repair fixture although this alternative is not shown in the illustrations. Handgrip surface 80 extends substantially the entire length of female end portion 73 to provide a large hand-griping surface for an installer to use in attaching the device into a pipe system.

Enlarged segments 76 as shown extend outward from handgrip surface 80 in a partially circular shape when seen looking from the end of male end portion 74 as shown in FIG. 10. Referring to FIG. 10 enlarged segments 76 extends around the perimeter of male end portion 74 and has several relief sections 78 equally spaced there around. Relief sections 78 are shown as being partially circularly in shape with a concave outer surface. Relief sections 78 are equally spaced in four locations around the repair fixture. Enlarged segments 76 are provided to give the installer a hand abutment at the end of hand grip surface 80 to aid in gripping pipe repair fixture 72 and moving it longitudinally during the installation process described above.

Relief sections 78 are formed in a partially circular shape so as to permit the juxtapositioning of pipes or plumbing fixtures in adjacent proximity to pipe repair fixture 72. It is to be noted that enlarged segments 76 are aligned longitudinally along the axis of female end portion 73 so as to accommodate a pipe alongside within recesses 78. The close positioning of irrigation pipes is a common occurrence when they pass through in a confined area, or where multiple valves are at one location in a complex irrigation system. Because segment relief sections 78 are concave and partially circular they will accommodate an adjacent circularly shaped pipe to reside therein when positioned in a justapositional juxtapositional relationship. This arrangement of shapes will prevent an existing pipe to not be unduly bent or deformed around pipe repair fixture 72. Four of such segment recesses 78 are shown in FIG. 9. The plurality of segment recesses 78 can be provided in an equidistant spaces relation around pipe repair fixture 72 or in a staggered spaced relationship. Depending upon the size of pipe repair fixture it may be helpful to have more of fewer of segment recesses 78. It is important to note that it is not a strict requirement that segments 76 be generally circular in shape but only that they be protrusions from the pipe repair fixture with spaces there between to accommodate placement of a closely adjacent pipe there between. Segment recesses 78 can also be described as portions of the perimeter of conduit repair fitting located between the protrusions 76.

The outer surface of conduit repair fitting 72 is provided with a pipe cut measuring line 82 encircling the exterior of the fixture. Measuring line 82 is provided as a gage or measuring guide for measuring the length of damaged pipe and associated items to be removed. Measuring line 82 can be either a raised segment of the surface, a groove in the surface or an indelible mark on the surface circumscribing the pipe repair fixture. Measuring line 82 is spaced a predetermined distance from the end of female end portion so it can be used as an indicator for the preferred space needed between the opposing ends of the conduits to be joined with the repair fixture. The distance from the pipe cut measuring line 82 to the end of the female end portion is selected to provide adequate coverage of the female end portion over the associated conduit once it is installed in place in the conduit system. This measurement will of course vary depending upon the length of the male and female end portions, the diameter and pressure rating of the pipes to be joined. Because the conduit repair fixture of this invention can be made to repair a wide range of physical sizes and types of pipe its physical strength and dimensions will also vary in order to meet regulated piping code requirements for the specific sizes. In use this pipe cut measuring line 82 on the side of the conduit repair fixture will serve as a distance measuring gauge in cutting the pipes to be joined as well as the fixture to be used in joining the pipes.

Pipe repairs may be made with a conduit repair fitting without threading, by the use of adhesives such as solvent cement types to the ends of the pipes and pushing the conduit repair fitting onto one end of the cut pipe. Inserting the preglued female, elongated portion on the cut pipe and sliding or pulling back the same device to insert the pre-glued male end into a receiver or collar on the other end of the cut pipe. The method is simple and can be done quickly, with no complicated o-rings, telescoping members, chambers, and the like. This push-pull repair fixture is very simple to install in a push-pull action without substantially misaligning or displacement of the cut pipe for applying the repair fixture of the invention in an aligned manner with the damaged pipe.

It should be pointed out that flexing of the pipe and insertion of the pipe end into the standard pipe collar for reconnection should be accomplished within a few seconds after the glue or cement has been applied to the pipe end. Because plastic pipe cement is a quick setting compound a delay may prevent the components from being properly joined. Comparatively, when using the prior art devices the reconnecting maneuver requires precise maneuvering and placement of multiple parts; therefore these devices could not be installed easy or quickly. However, the present push-pull simple one-piece pipe repair fixture has made the process much simpler and one that can be accomplished quicker by one skilled in piping system repair.

In operation, when an underground plastic or PVC pipe is damaged, or even other types of pipe, the area adjacent thereto may be evacuated to fully expose the damaged site. The damaged portion may be removed by severing the pipe to expose the aligned and conforming ends that are cut in a plane perpendicular to the longitudinal axis of such pipe and are spaced apart in a predetermined length, ranging from about 3 up to 6 inches or more. The push-pull repair fixture of the present invention may then be positioned on and between the spaced apart ends of the severed pipe.

It can be appreciated by those of ordinary skill in the art that the pipe repair fixture of this invention is very inexpensive to construct, yet it provides a significant improvement over the prior art multi part slip joint couplings, and the telescoping couplings. The repair fixture of the invention is simply and quickly applied with glue and pushed over the severed pipe first end followed by pulling of the conduit repair fixture into alignment and insertion with the male end within a replacement fixture or receiver element mounted on a second repair pipe end. A joint formed by the pipe repair fixture is strong and reliable but even more importantly such a repair fixture joint does not take up an undue amount of lateral space and can be installed in a more confined area than most prior art coupling joints.

While this invention has been described in conjunction with the use of PVC type pipe and fixtures it is understood that it could be adapted to other pipe systems made from materials such as glass, ceramic, steel, and other plastic materials. Also, while this invention is described in conjunction with landscape irrigation systems having relatively small diameter pipes it to be understood that it can be made in larger sizes to be used on large diameter pipes such as are used as major water conduits, sewer pipes, and pipelines of virtually any type.

It will be appreciated that although specific (and exemplary) embodiments of the present invention have been illustrated in the drawings and have been described above, variations from those embodiments which have not been foreshadowed in the above description, are possible without departing from the present inventive concept.

What is claimed is:

1. Apparatus, comprising:
   (a) first and second conduits each respectively having open ends, with said ends being spaced from one another a fixed, predetermined distance, at least one of said conduits being substantially unbendable prior to repair,
   (b) a conduit repair coupling including a unitary tubular body having a first end portion with an elongated female portion and an opposite second end portion with a male portion,
   (c) said unitary body having a total length greater than said predetermined distance between said ends of said first and second conduits,
   (d) said female portion having an internal opening capable in size of receiving said first conduit end, said male portion having an external size capable of entering said second conduit end,
   (e) said end of said first conduit secured to said female portion, and said end of said second conduit secured to said male portion,
   (f) wherein the exterior of said female portion has a plurality of protrusions extending radially outwardly therefrom at from each of opposite end portions thereof forming a plurality of recesses there between, said protrusions adapted to receive a portion of an adjacent positioned pipe between said protrusions, and
   (g) wherein said protrusions are circumferentially-enlarged, externally convexly-shaped segments and said recesses are concavely-shaped to accommodate the cylindrical exterior of an adjacent conduit therein.

2. Apparatus, comprising:
   (a) first and second pipes each respectively having open ends with said ends being spaced from one another a fixed, predetermined distance, with at least one of the pipes being fixed such that it is substantially unbendable prior to repair,
   (b) a pipe repair coupling including a unitary tubular body having a first end portion with an elongated female portion and an opposite second end male portion,
   (c) said unitary body having a total length greater than said predetermined distance between said ends of said first and second pipes,
   (d) said female portion having an internal size receiving said first pipe end, said second end male portion connected to said second pipe end,
   (e) said female portion having sufficient length to permit a retracting displacement over said end portion of said first pipe to permit positioning of said second end male portion in alignment with said opening of said second pipe such that upon subsequent displacement into connecting contact with said second pipe end maintaining contact with said first pipe thereby joining said first and second pipes, and
   (f) wherein said female portion has a plurality of outwardly extending protrusions at opposite ends thereof forming a plurality of recesses there between with said recesses being adapted to receive an adjacent pipe therein and between said protrusions, and said protrusions each are convex in shape on the outer periphery thereof similar to segments of a circular ring and said recesses each being of a partially- circular concave shape.

* * * * *